(12) United States Patent
Müller

(10) Patent No.: US 6,739,860 B2
(45) Date of Patent: May 25, 2004

(54) ARRANGEMENT FOR AN INTEGRAL TWO-STAGE EJECTOR

(75) Inventor: Hans Müller, Pejlingsvägen 6, SE-506 70 Frufällan (SE)

(73) Assignee: Hans Müller (SE)

( * ) Notice: Subject to any disclaimer, the term of this patent is extended or adjusted under 35 U.S.C. 154(b) by 63 days.

(21) Appl. No.: 09/935,435

(22) Filed: Aug. 23, 2001

(65) Prior Publication Data

US 2003/0003185 A1 Jan. 2, 2003

(30) Foreign Application Priority Data

Jul. 2, 2001 (SE) .............................................. 0102371

(51) Int. Cl.$^7$ .............................................. B29C 45/40
(52) U.S. Cl. ........................ 425/182; 425/556; 425/444
(58) Field of Search ................................ 425/444, 556, 425/810, 182; 264/334, 336

(56) References Cited

U.S. PATENT DOCUMENTS 4,372,741 A * 2/1983 Cane et al. .................. 425/556
4,412,806 A * 11/1983 Gaiser et al. ................ 425/554
4,496,302 A * 1/1985 Brown ........................ 425/547

FOREIGN PATENT DOCUMENTS

JP  04128020 A * 4/1992 ........... B29C/45/40

* cited by examiner

*Primary Examiner*—Robert Davis
*Assistant Examiner*—Joseph S. Del Sole
(74) *Attorney, Agent, or Firm*—Orum & Roth

(57) ABSTRACT

An arrangement (2) for a two-stage ejector (3), which has a follow-on action, capable of installation centrally in a moulding tool (1). The injector has a rear ejector part (5) exhibiting connecting means (4) for attachment of the injector (3) to an injection moulding machine. The rear ejector part, is capable of detachable attachment to the remaining part (6) of the ejector (3).

12 Claims, 3 Drawing Sheets

ARRANGEMENT FOR AN INTEGRAL TWO-STAGE EJECTOR

BACKGROUND OF THE INVENTION

1. Field of the Invention

The present invention relates to an arrangement for a two-stage ejector, with a follow-on action, capable of installation centrally in a moulding tool.

2. Description of Related Arts

Previously disclosed are laterally positioned ejectors of the kind under consideration, each of which sits to either side of a mould and is also used for resetting the ejector plates concerned. The aforementioned previously disclosed ejector arrangements are not suitable for direct connection to an injection moulding machine. After disconnection of the mould, this does not readily lend itself to easy handling and to laying flat on a worktable or some other base because of the parts projecting from the mould. A smooth under surface is also preferable when storing the mould.

BRIEF SUMMARY OF THE INVENTION

The principal object of the present invention is thus, in the first instance, to solve the aforementioned problems simply and effectively and without being obliged to make excessively major interventions in the mould in question.

The aforementioned object is achieved by means of an arrangement in accordance with the present invention, which is characterized essentially in that a rear ejector part exhibiting connecting means for attachment of the ejector to an injection moulding machine is capable of detachable attachment to the remaining part of the ejector.

BRIEF DESCRIPTION OF THE DRAWINGS

The invention is described below with reference to the accompanying drawings, in which.

DETAILED DESCRIPTION OF THE INVENTION

Figure 1:
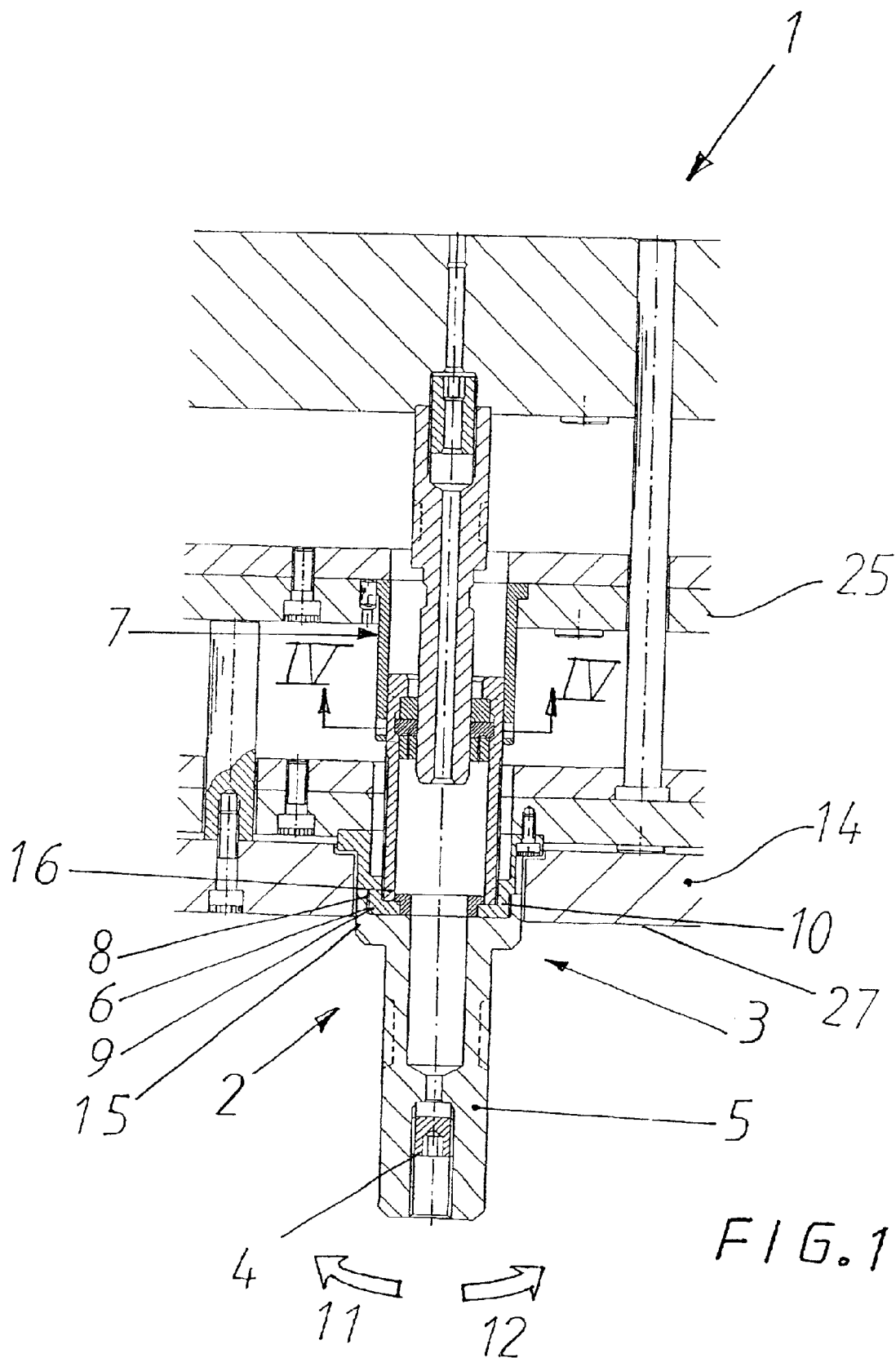
FIG. 1 shows a sectional view of a moulding tool with pairs of ejector plates situated in a position in which they are ready to be extended.
Figure 2:
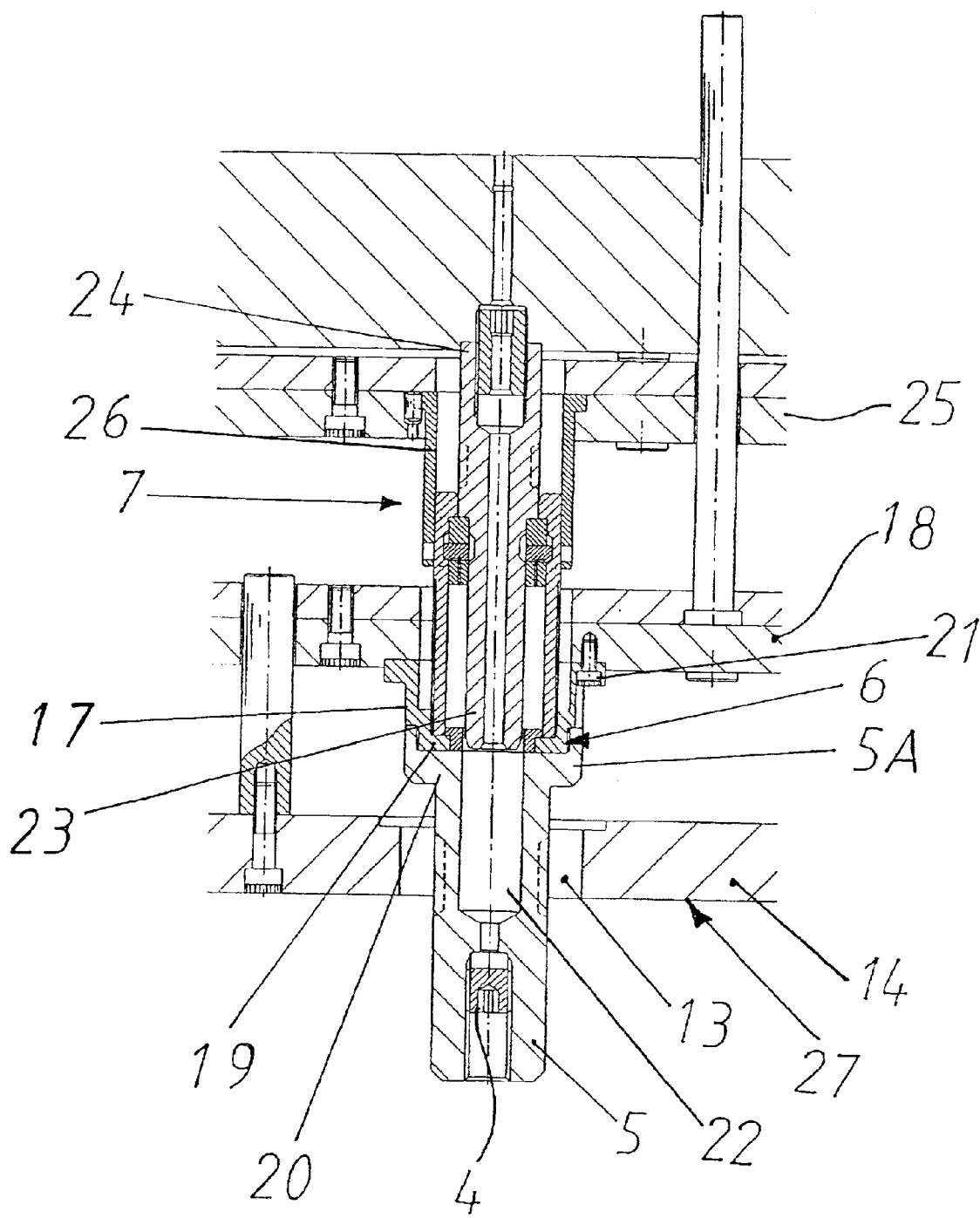
FIG. 2 shows the two ejector plates in a common extended position.
Figure 3:
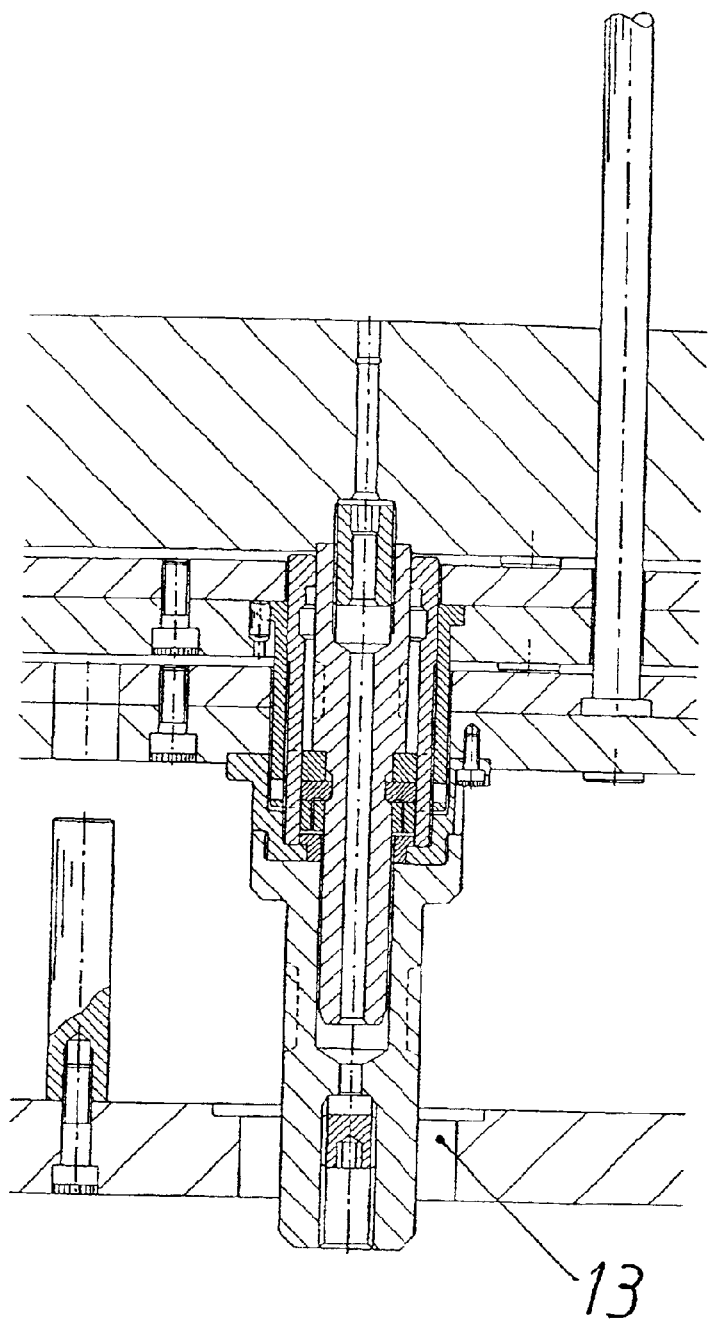
FIG. 3 shows the rear ejector plate extended to its end position.
Figure 4:
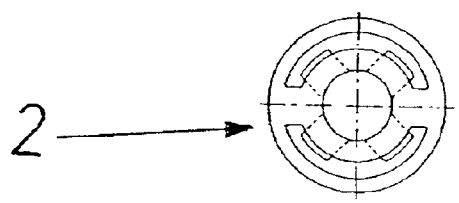
FIG. 4 shows a sectional view along the line IV—IV in FIG. 1.

The present invention finds an application in a moulding tool 1 in the form of a plastic moulding tool for the injection moulding of plastic components therein. The arrangement 2 in accordance with the invention is intended to achieve the ejection of moulded plastic components from the aforementioned moulding tool 1.

An arrangement 2 of the indicated kind, which is situated on a so-called two-stage ejector 3 capable of installation centrally in the moulding tool 1, and which has a follow-on action, comprises connecting means 4 for attachment of the ejector 3 to an injection moulding machine (not shown in the drawing). In accordance with the invention the rear ejector part 5 of the ejector 3 exhibits an attachment 6 which permits manual actuation of the aforementioned ejector part 5 so that his can be readily detached from the remaining part of the ejector 3 and the aforementioned moulding tool 1. The aforementioned rear ejector part 5 is thus capable of detachable attachment to the remaining part 7 of the ejector 3.

The attachment 6 between the aforementioned rear ejector part 5 and the remaining part 7 of the ejector 3 is in the form of a threaded connection. More specifically, an internal thread 8 in the aforementioned rear ejector part 5 is so arranged as to enclose and accommodate an external thread 9 in a remaining part 10 of the threaded connection 6. The aforementioned detachable ejector part 5 can thus be removed easily, either by hand or with the help of tools, from the telescope-like ejector 3 and attached thereto simply by rotation in the intended direction 11, 12.

The aforementioned rear ejector part 5 is accommodated in such a way as to be displaced through a transcurrent opening 13 in the mould, namely in the tool carrier 14, in conjunction with which the form of the aforementioned opening is adapted to the front end part 5A of the aforementioned rear ejector part.

The aforementioned rear ejector part 5 exhibits an enlarged accommodating part 15 to accommodate the part 10 and the rear end 16 of an adjacent, cylindrical part of the ejector part 5.

An attachment part 17, which is preferably in the form of a sleeve of irregular shape, to permit detachable attachment of the ejector 3 to an ejector plate 18 situated to its rear, is accommodated with a flange part 19 on the front end 20 of the aforementioned rear ejector part 5.

The aforementioned attachment part 17 is secured by means of screws 21 to the rear ejector plate 18.

The aforementioned rear ejector part 5 exhibits an internal attachment part 4 for detachable attachment to an injection moulding machine (not shown here) and an internal recess 22 at its opposite end for the purpose of accommodating a part 23 of a piston 24 situated at the front of the telescopic ejector arrangement, which is accommodated internally in the part 26 of the ejector 3 provided with a front tool plate 25.

The advantages of the present invention include the fact that the aforementioned two-stage ejector is located at the centre of the mould and is so arranged that it can be attached directly to the injection moulding machine.

When the machine is not is use, the rear part 5 is unscrewed and the mould is thus totally smooth on its under side 27, enabling it to be stood on a worktable or handled in conjunction with any necessary repairs. A smooth under surface is also preferably when storing the mould. Today's moulding tools often have reverse functions or projecting core features, which makes handling difficult when the moulding tool is lying on its side.

The invention is not restricted to the illustrative embodiment described above and illustrated in the drawings, but may be varied with in the scope of the patent claims without departing from the idea of invention.

What is claimed is:

1. Arrangement for a two stage ejector, with a follow-on action, capable of installation centrally in a molding tool characterized in that a rear ejector part exhibiting connecting means for the attachment of the ejector to an injection molding machine is capable of detachable attachment to the remaining part of the ejector;

the rear ejector part is accommodated in such a way as to be displaced through a transcurrent opening in the mold;

the form of the opening is adapted to the front end part of the rear ejector part;

the rear ejector part exhibits an enlarged accommodating part to accommodate the rear end of an adjacent part of the ejector part;

an attachment part for detachable attachment of the ejector to an ejector plate situated to its rear, is accommodated with a flanged part on the front end on the rear ejector part; and the attachment part is secured by means of screws to the rear ejector plate.

2. Arrangement in accordance with claim 1, characterized in that the rear ejector part exhibits an internal attachment part for detachable attachment to the injection moulding machine and an internal recess to accommodate a part of a piston situated at the front of the telescopic ejector arrangement.

3. Arrangement in accordance with claim 1, characterized in that the attachment between the rear ejector part and the remaining part of the ejector is in the form or a threaded connection.

4. Arrangement in accordance with claim 3, characterized in that an internal thread in the rear ejector part is so arranged as to enclose and accommodate an external thread in a remaining part of the threaded connection.

5. Arrangement in accordance with claim 1, characterized in that the attachment part is in the form of a sleeve of irregular shape.

6. Arrangement in accordance with claim 3, characterized in that the attachment part is in the form of a sleeve of irregular shape.

7. Arrangement in accordance with claim 4, characterized in that the attachment part is in the form of a sleeve of irregular shape.

8. Arrangement in accordance with claim 3, characterized in that the rear ejector part exhibits an internal attachment part for detachable attachment to the injection molding machine and an internal recess to accommodate a part of a piston situated at the front of the telescopic ejector arrangement.

9. Arrangement in accordance with claim 4, characterized in that the rear ejector part exhibits an internal attachment part for detachable attachment to the injection moulding machine and an internal recess to accommodate a part of a piston situated at the front of the telescopic ejector arrangement.

10. Arrangement in accordance with claim 5, characterized in that the rear ejector part exhibits an internal attachment part for detachable attachment to the injection moulding machine and an internal recess to accommodate a part of a piston situated at the front of the telescopic ejector arrangement.

11. Arrangement in accordance with claim 6, characterized in that the rear ejector part exhibits an internal attachment part for detachable attachment to the injection moulding machine and an internal recess to accommodate a part of a piston situated at the front of the telescopic ejector arrangement.

12. Arrangement in accordance with claim 7, characterized in that the rear ejector part exhibits an internal attachment part for detachable attachment to the injection moulding machine and an internal recess to accommodate a part of a piston situated at the front of the telescopic ejector arrangement.

* * * * *